United States Patent
Imsdahl et al.

(10) Patent No.: US 6,206,348 B1
(45) Date of Patent: Mar. 27, 2001

(54) EVAPORATIVE COOLER FOR A GAS TURBINE ENGINE

(75) Inventors: John A. Imsdahl, Bloomington, MN (US); Leon R. H. Cuvelier, Hamme-Mille (BE); Alan John Spychalla, Inver Grove Heights, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/195,507

(22) Filed: Nov. 18, 1998

(51) Int. Cl.[7] .............................. B01D 47/16; F02M 17/28
(52) U.S. Cl. ........................ 261/95; 261/103; 261/106; 261/DIG. 3; 261/DIG. 4; 261/DIG. 11; 261/DIG. 15; 261/DIG. 41; 261/DIG. 43
(58) Field of Search ...................................... 261/103, 106, 261/DIG. 41, DIG. 43, 94, 95, 100, DIG. 11, DIG. 15, DIG. 3, DIG. 4

(56) References Cited

U.S. PATENT DOCUMENTS

| | | | |
|---|---|---|---|
| H35 | * | 3/1986 | Berkowitz ............................ 426/135 |
| 890,332 | * | 6/1908 | Bruhorn . |
| 4,215,079 | * | 7/1980 | Christophersen .................. 261/36 R |
| 4,774,034 | * | 9/1988 | Fritz ............................. 261/DIG. 11 |
| 4,895,066 | * | 1/1990 | Carnahan ............................ 98/42.22 |
| 5,199,457 | * | 4/1993 | Miller .................................... 137/312 |
| 5,492,158 | * | 2/1996 | Haag ...................................... 141/98 |
| 6,022,392 | * | 2/2000 | Wurz ...................................... 55/422 |

OTHER PUBLICATIONS

Exhibits 1 and 2 showing an admitted prior art evaporative cooler configuration.

* cited by examiner

Primary Examiner—Chester T. Barry
(74) Attorney, Agent, or Firm—Merchant & Gould P.C.

(57) ABSTRACT

The present disclosure relates to an evaporative cooler including first and second trays each having a longitudinal axis. Each tray includes a bottom wall and two side walls that project upward from the bottom wall and extend generally parallel to the longitudinal axis of each tray. Each tray also includes two end walls that project upward from the bottom wall and extend between the side walls. Each tray further includes spaced apart cooler media retaining members that are generally parallel to the longitudinal axis of each tray. The trays are positioned in an end-to-end relationship such that the longitudinal axes of the trays are generally aligned with one another, and one of the end walls of the first tray is positioned adjacent to one of the end walls of the second tray. The evaporative cooler also includes an elongated clip adapted to extend the between the adjacent end walls of the first and second trays for inhibiting water leakage between the adjacent walls.

12 Claims, 16 Drawing Sheets

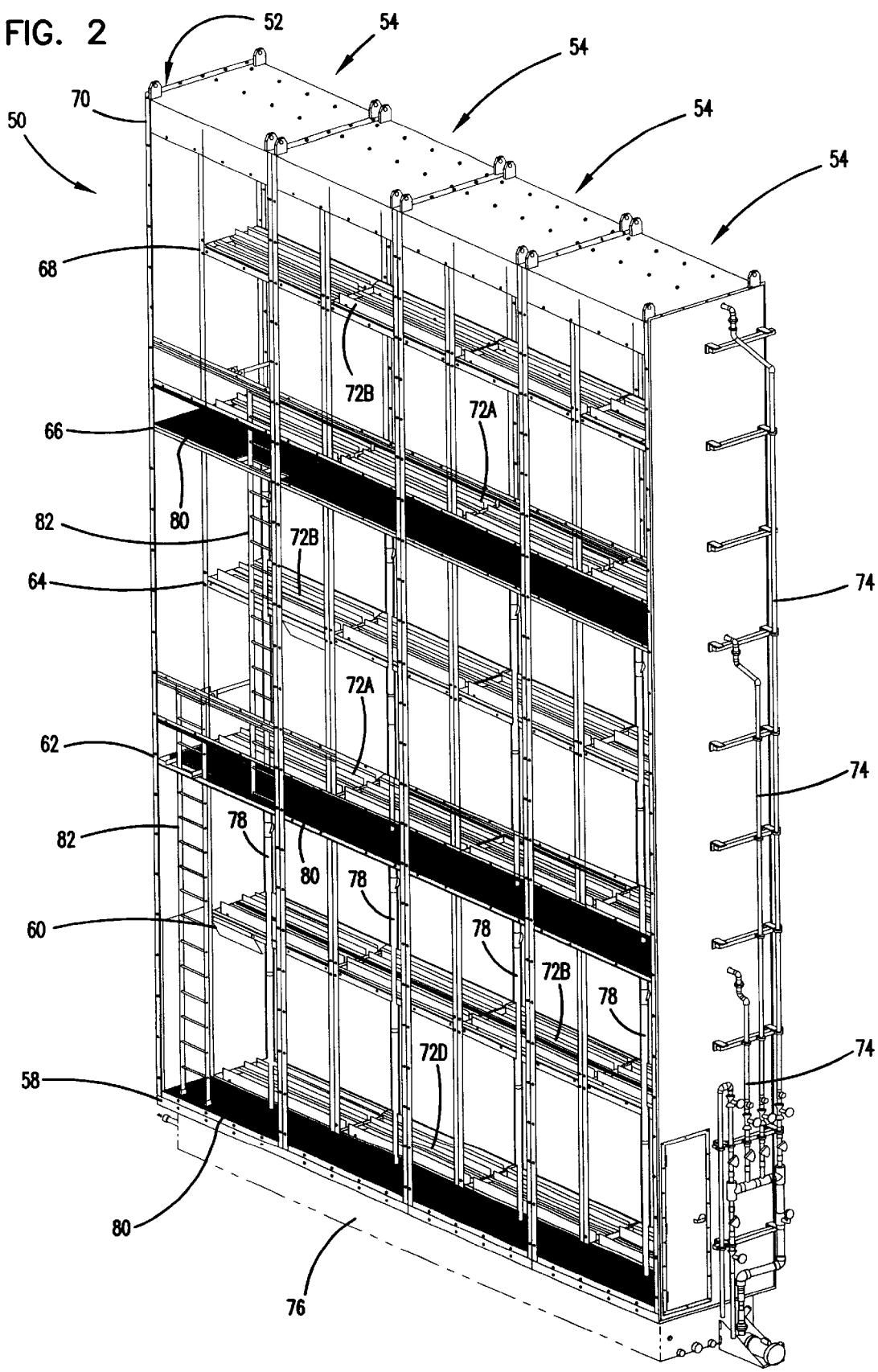

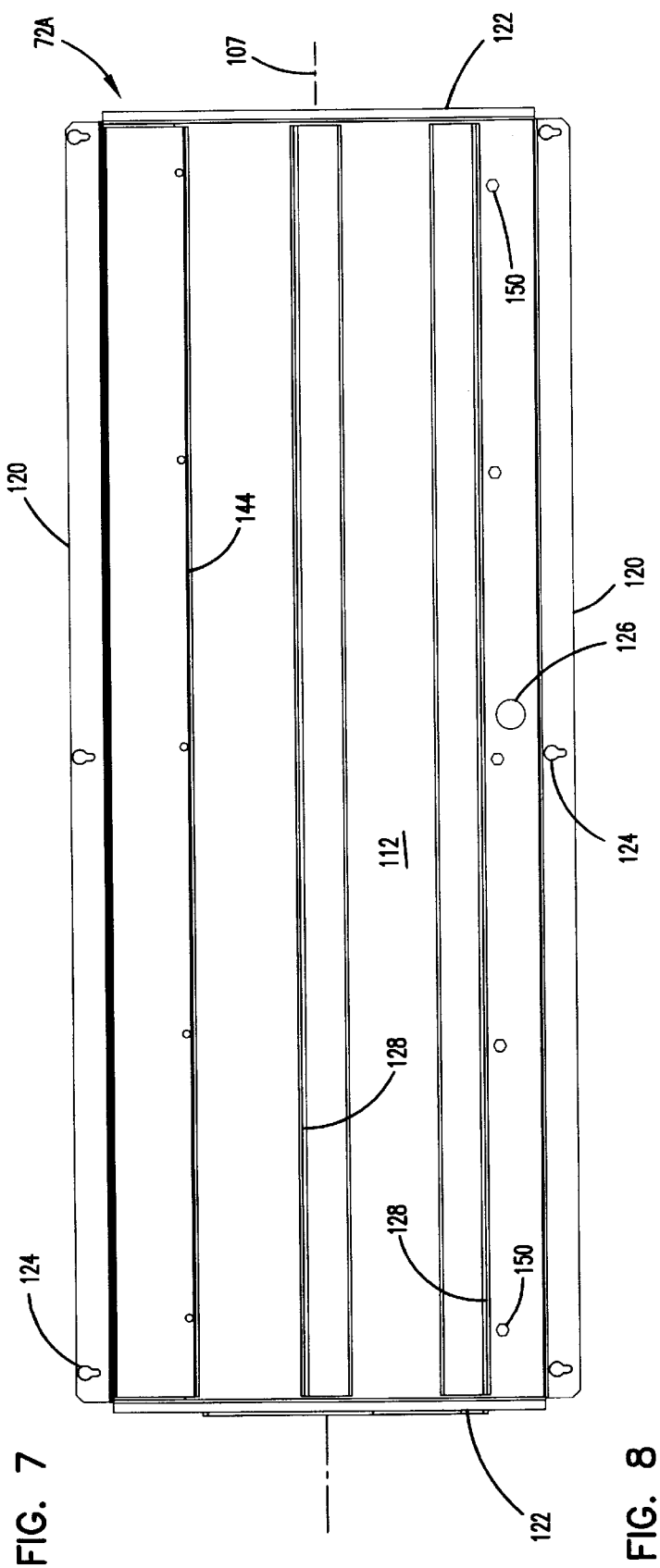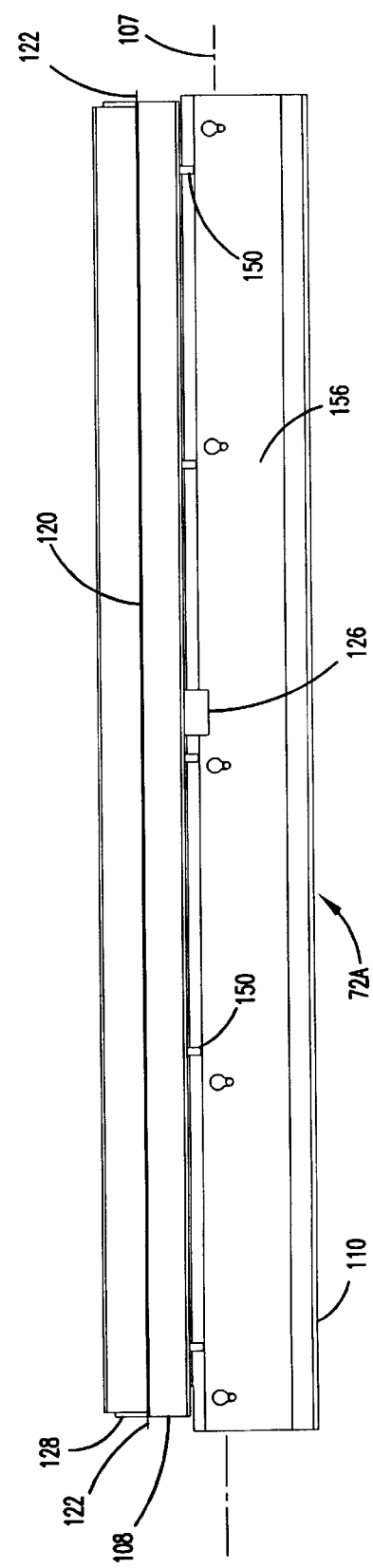
FIG. 7
FIG. 8

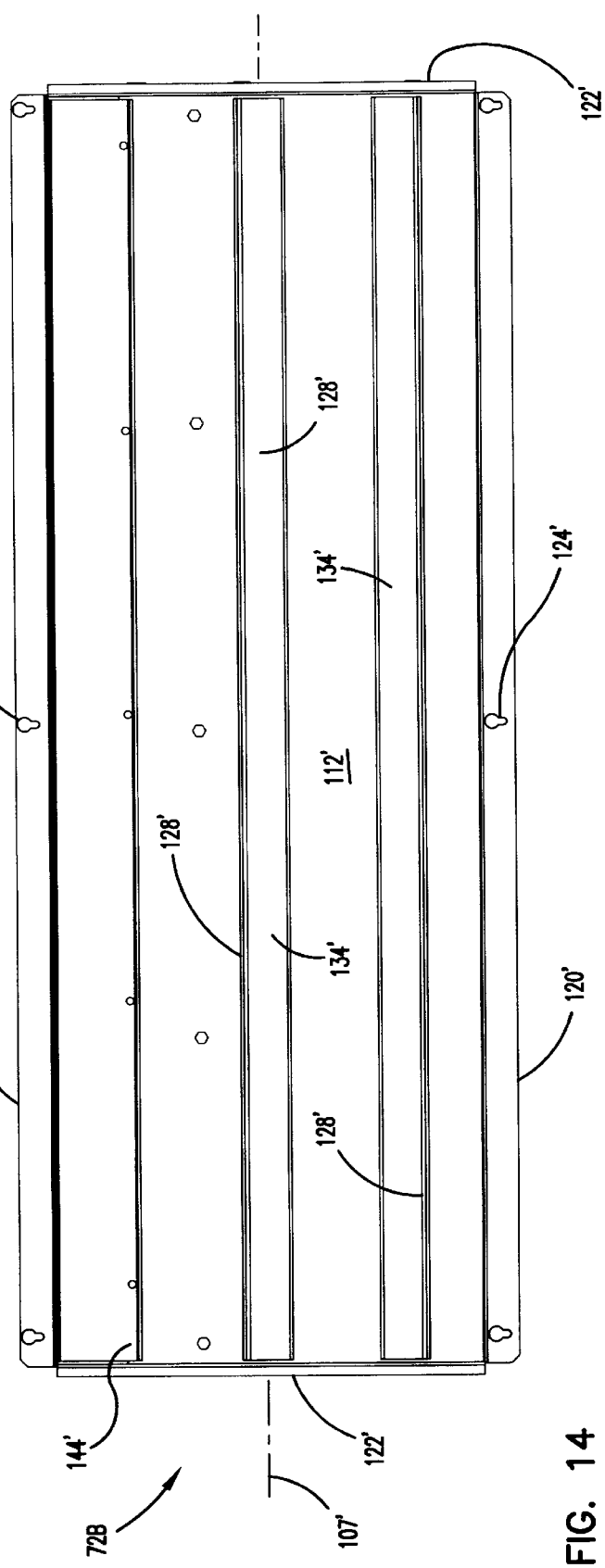
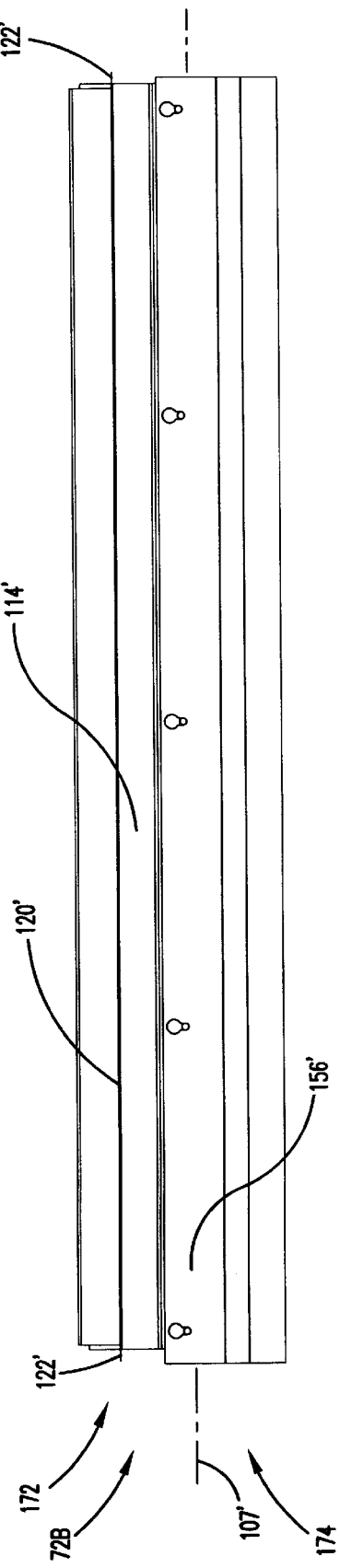

EVAPORATIVE COOLER FOR A GAS TURBINE ENGINE

FIELD OF THE INVENTION

The present invention relates generally to evaporative coolers. More particularly, the present invention relates to evaporative coolers for use in gas turbine intake air systems, and to methods for assembling evaporative coolers.

BACKGROUND OF THE INVENTION

A gas turbine engine works more efficiently as the temperature of the intake air drawn into the gas turbine decreases. Turbine efficiency is dependent upon the temperature of the intake air because turbines are constant volume machines. The density of the intake air increases as the temperature of the intake air drops. Consequently, by decreasing the temperature of the intake air, the mass flow rate to the turbine is increased which increases the efficiency of the turbine.

Evaporative cooling is an economical way to reduce the temperature of the intake air drawn into the turbine. An evaporative cooler commonly includes a plurality of vertically stacked volumes of cooler media. A distribution manifold disperses water over the tops of the volumes of cooler media. The water is drawn from a sump, distributed over the volumes of media by the distribution manifold, and then recycled back to the sump. Intake air for the gas turbine flows through the volumes of cooler media. As the water falls or flows through the volumes of cooler media, the air passing through the media evaporates some of the water. The evaporation process removes some energy from the air, thereby reducing the temperature of the air.

SUMMARY OF THE INVENTION

One aspect of the present invention relates to an evaporative cooler including first and second trays each having a longitudinal axis. Each tray includes a bottom wall and two side walls that project upward from the bottom wall and extend along the lengths of the trays. Each tray also includes two end walls that project upward from the bottom wall and extend between the side walls along the widths of the trays. The trays additionally include spaced-apart cooler media retaining members that are generally parallel to the side walls. The first and second trays are positionable in an end-to-end relationship such that the longitudinal axes are generally aligned with one another, and one of the end walls of the first tray is positioned adjacent to one of the end walls of the second tray. The evaporative cooler also includes an elongated clip adapted to extend between the first and second trays for inhibiting water leakage between the trays.

Another aspect of the present invention relates to an evaporative cooler including a frame defining a plurality of substantially vertical bays aligned in a generally side-by-side relationships, and a plurality of vertically spaced apart, substantially horizontal levels. Trays that support volumes of cooler media are mounted on the frame. The trays are positioned in the bays of the frame with trays of common levels being arranged in end-to-end relationships. The evaporative cooler also includes elongated clips for inhibiting water leakage between end walls of the trays.

A further aspect of the present invention relates to a tray for an evaporative cooler. The tray includes a modular tray body sized for mounting in a bay of an evaporative cooler frame. The tray body includes a longitudinal axis. The tray body also includes a bottom wall, and two side walls that project upward from the bottom wall and extend along a length of the tray body. The tray further includes two end walls that project upward from the bottom wall and extend along a width of the tray body. The tray additionally includes spaced-apart cooler media retaining members that are generally parallel with respect to the side walls. The spaced-apart cooler media retaining members define a gap sized and shaped for receiving a portion of a volume of cooler media.

Still another aspect of the present invention relates to a method for assembling an evaporative cooler. The method includes the step of providing a frame. The method also includes the step of providing first and second trays each having a separate longitudinal axis. Each tray includes a bottom wall and two side walls that project upward from the bottom wall and extend generally parallel to the longitudinal axis of each tray. Each tray also includes two end walls that project upward from the bottom wall and extend between the side walls. The trays additionally include spaced-apart cooler media retaining members that extend generally parallel to the longitudinal axis of each tray. The method further includes the step of securing the first and second trays to the frame in an end-to-end relationship such that the longitudinal axis of the first tray aligns with the longitudinal axis of the second tray, and one of the end walls of the first tray is positioned adjacent to one of the end walls of the second tray. Finally, the method includes the step of placing an elongated clip over a gap defined between the adjacent end walls of the first and second trays.

A variety of advantages of the invention will be set forth in part in the description which follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows:

FIG. 2 is a perspective view of an evaporative cooler constructed in accordance with the principles of the present invention;

FIG. 7 is a top plan view of the tray of FIG. 6;

FIG. 8 is a front side view of the tray of FIG. 7;

FIG. 13 is a top plan view of the tray of FIG. 12;

FIG. 14 is a front side view of the tray of FIG. 13;

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

As described in the background of the invention, evaporative cooling is an economical way to reduce the temperature of the intake air drawn into a gas turbine. In operating an evaporative cooler, it is important to prevent the evaporative cooling water from reaching the gas turbine. If water from the evaporative cooler does reach the gas turbine, the gas turbine can be damaged.

Conventional evaporative coolers commonly include multiple levels of trays for supporting volumes of evaporative cooler media. The trays of each level are arranged in end-to-end relationships with respect to one another. Gaps or spaces are formed between the ends of the trays. If the gaps or spaces are not sealed, water is likely to leak between the trays and migrate downstream toward the gas turbine. To prevent leakage, the prior art teaches welding the ends of the trays together. Such a welding process is typically a time consuming endeavor. This is particularly true if precise alignment cannot be achieved between adjacent trays.

To overcome the above identified problem, one aspect of the present invention relates to using clips to prevent water leakage between adjacent trays. In certain embodiments, the clips can be separate pieces from the trays. In other embodiments, the clips can be integrally formed with at least one of the adjacent trays.

The use of clips provides numerous advantages over conventional welding. For example, clips can be mounted between two trays in a fraction of the time it takes to weld two trays together. Also, clips can be used to prevent leakage between trays, even if precise alignment is not achieved between the trays. Furthermore, the use of clips provides greater flexibility in the types of materials that can be used to manufacture the trays. For example, by eliminating the need for welding the ends of the trays, the trays can be made of a metal material or an alternative material such as plastic. The use of plastic material is advantageous over metal because plastic is lighter and less expensive than metal. The clips can also be made of any number of different types of materials such as metal or plastic. The following paragraphs describe one particular evaporative cooler that includes features that are examples of the broad inventive aspect described above.

Figure 1A:
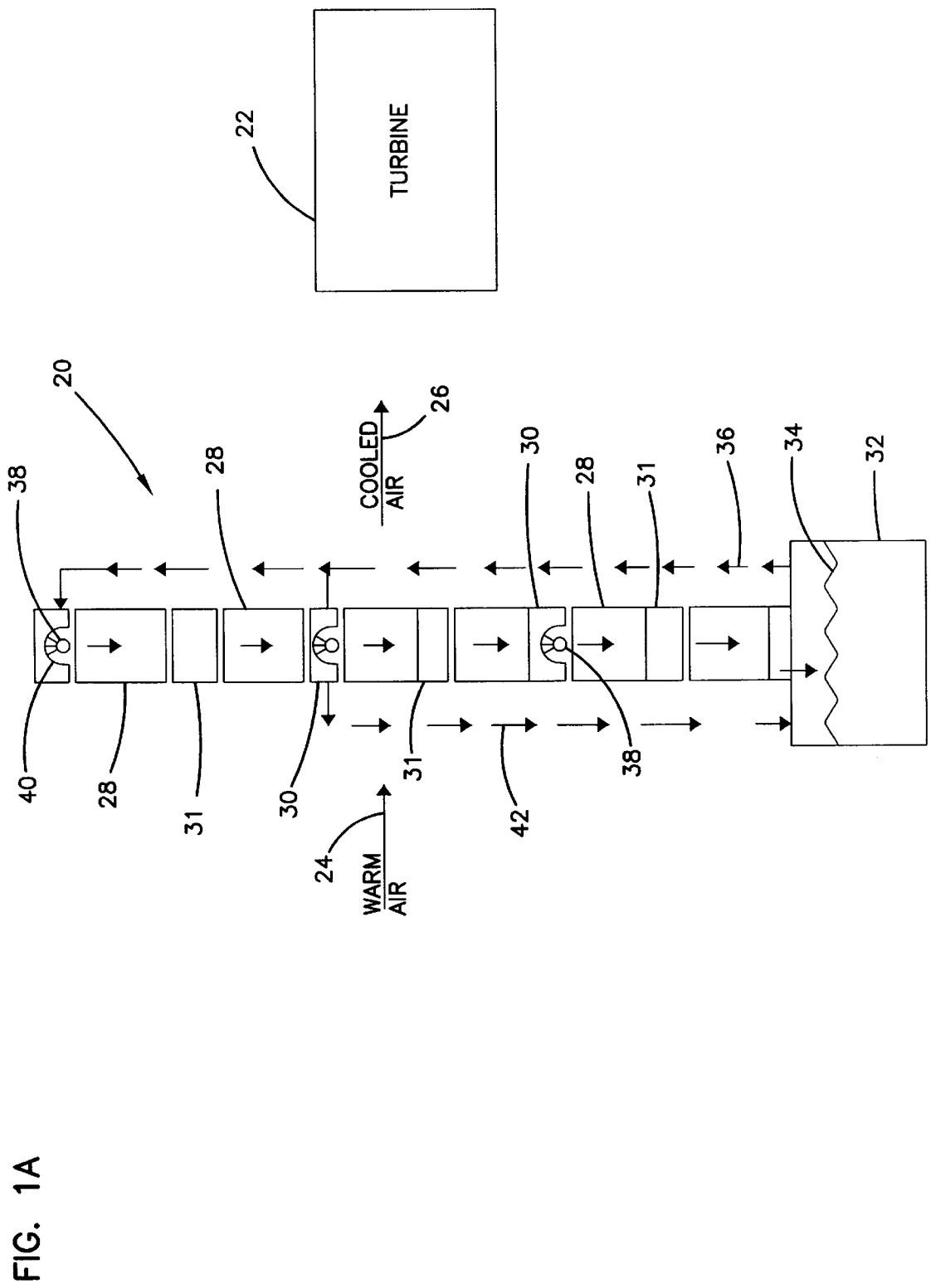
FIG. 1A is a schematic end view of an embodiment of an evaporative cooler for a turbine air intake system.
Figure 1B:
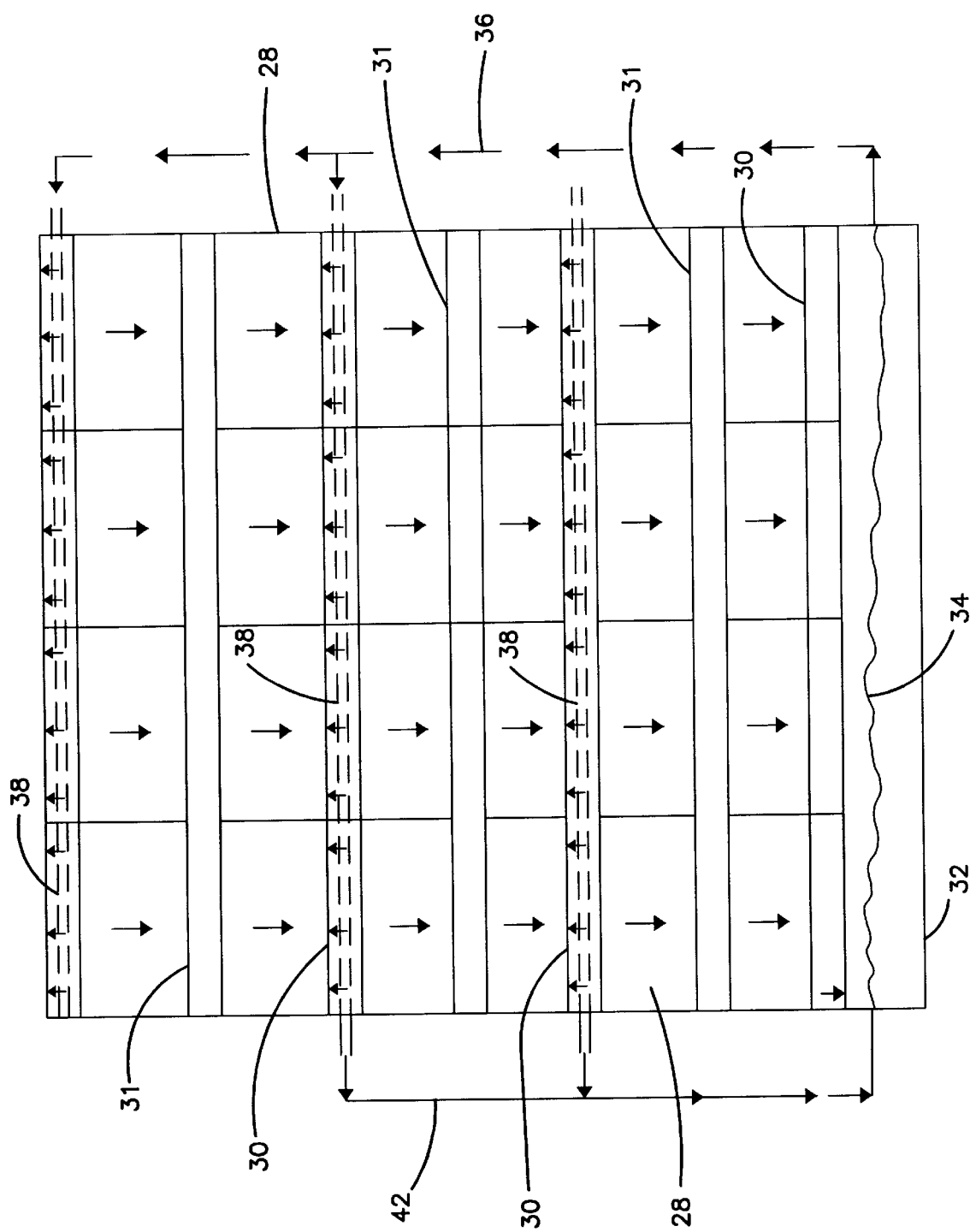
FIG. 1B is a schematic left side view of the evaporative cooler of FIG. 1A.

FIGS. 1A and 1B schematically illustrate an embodiment of an evaporative cooler 20 constructed in accordance with the principles of the present invention. The evaporative cooler 20 is adapted for cooling intake air that is drawn into a gas turbine 22. As shown in FIG. 1A, warm air 24 flows into the left side of the cooler 20, while cooled air 26 exits the right side of the cooler 20. The cooled air 26 flows through a turbine air intake system to the turbine 22.

As shown in FIGS. 1A and 1B, the evaporative cooler 20 includes a plurality of vertically stacked volumes of cooling media 28. The volumes of cooling media 28 are supported on trays 30, 31. The trays 30 are collection trays and function to collect water that drains downward through the volumes of cooling media 28. The trays 31 are flow-through trays that support volumes of cooling media 28, but have openings for allowing water to pass through the trays 31. The trays 30, 31 are preferably connected to a rigid frame work (not shown in FIGS. 1A and 1B) that holds the trays 30, 31 and volumes of cooling media 28 in vertically stacked alignment.

The volumes of cooling media 28 can be made of any type of material conventionally used in evaporative coolers. For example, the cooling media can comprise a honeycomb of cellulose based product with resins to enhance rigidity. Suitable cooling media are sold by Munters Corporation of Fort Myers, Fla.

The evaporative cooler 20 also includes a sump or reservoir 32 for holding a volume of water 34. The reservoir 32 preferably has a volume that is at least ten percent the total volume occupied by the volumes of cooling media 28. In use of the evaporative cooler 20, the water 34 from the reservoir 32 is circulated through the volumes of cooling media 28. As the warm air 24 flows through the volumes of cooling media 28, the air evaporates some of the water that is being circulated through the cooling media 28. The evaporation process removes energy from the air, thereby reducing its temperature.

To circulate the water 34 through the volumes of cooling media 28, the water 34 is pumped upward from the reservoir 32 through a manifold flow line 36. The manifold flow line 36 conveys the water 34 to a plurality of manifolds 38. The manifolds 38 include a plurality of upwardly facing spray orifices for spraying the water 34 in an upward direction. As best shown in FIG. 1A, the water 34 is sprayed from the manifolds 38 in an upward direction against curved dispersion plates 40. After being dispersed by the dispersion plates 40, the water 34 flows downward through the volumes of cooling media 28 via gravity and is collected in the collection trays 30. From the collection trays 30, the water 34 flows downward via gravity through a return line 42 that conveys the water 34 back to the reservoir 32. While a single return line 42 is schematically shown, it will be appreciated that multiple return lines can also be used. For example, separate return lines can be used for each column or bay of the evaporative cooler 20.

FIG. 2 illustrates an evaporative cooler 50 that is an embodiment of the present invention. The evaporative cooler 50 includes a frame 52 defining a plurality of substantially vertical bays 54 aligned in generally side-by-side relationships. The frame 52 also defines a plurality of vertically spaced-apart, substantially horizontal levels. For example, as shown in FIG. 2, the evaporative cooler 50 has seven levels that have been assigned, from bottom to top, reference numerals 58, 60, 62, 64, 66, 68 and 70. While FIG. 2 shows that the evaporative cooler 50 includes four bays 54 and seven separate levels, it will be appreciated that the present invention is not limited to such a configuration and that any number of bays or levels can be used.

The evaporative cooler 50 includes a plurality of separate, modular trays that are secured to the frame 52 at the various levels 58–70. For example, the evaporative cooler 50 includes collection trays 72A mounted at levels 62 and 66, flow-through trays 72B mounted at levels 60, 64 and 68, top trays 72C (shown in FIG. 4) mounted at level 70, and bottom trays 72D mounted at level 58. The collection trays 72A, the flow-through trays 72B and the bottom trays 72D are adapted for supporting volumes of evaporative cooler media. For clarity, the volumes of the cooler media are not shown in FIG. 2. The collection trays 72A are adapted for collecting water that is circulated through the volumes of cooling media, and are also adapted for dispersing water over the tops of the volumes of cooling media. The flow-through trays 72B include openings for allowing water to pass through levels 60, 64 and 68. Similar to the collection trays 72A, the bottom trays 72D are adapted for collecting water that is circulated through the volumes of cooling media. The top trays 72C function exclusively to disperse water over the tops of the volumes of cooling media.

Referring again to FIG. 2, the evaporative cooler 50 includes manifold flow lines 74 that convey water from a sump 76 to levels 62, 66 and 70 of the evaporative cooler 50. The evaporative cooler 50 also includes return lines 78 for returning water from the volumes of cooling media back to the sump 76. As shown in FIG. 2, a separate return line 78 is located at each bay 54 of the evaporative cooler 50. The return lines 78 drain the water that is collected in the collection and bottom trays 72A, 72D, and return the collected water back to the sump 76.

The evaporative cooler 50 includes grates 80 positioned at levels 58, 62 and 66. The grates allow an operator of the evaporative cooler 50 to access the various levels and bays of the cooler. Ladders 82 extend between the grates 80.

Figure 3:
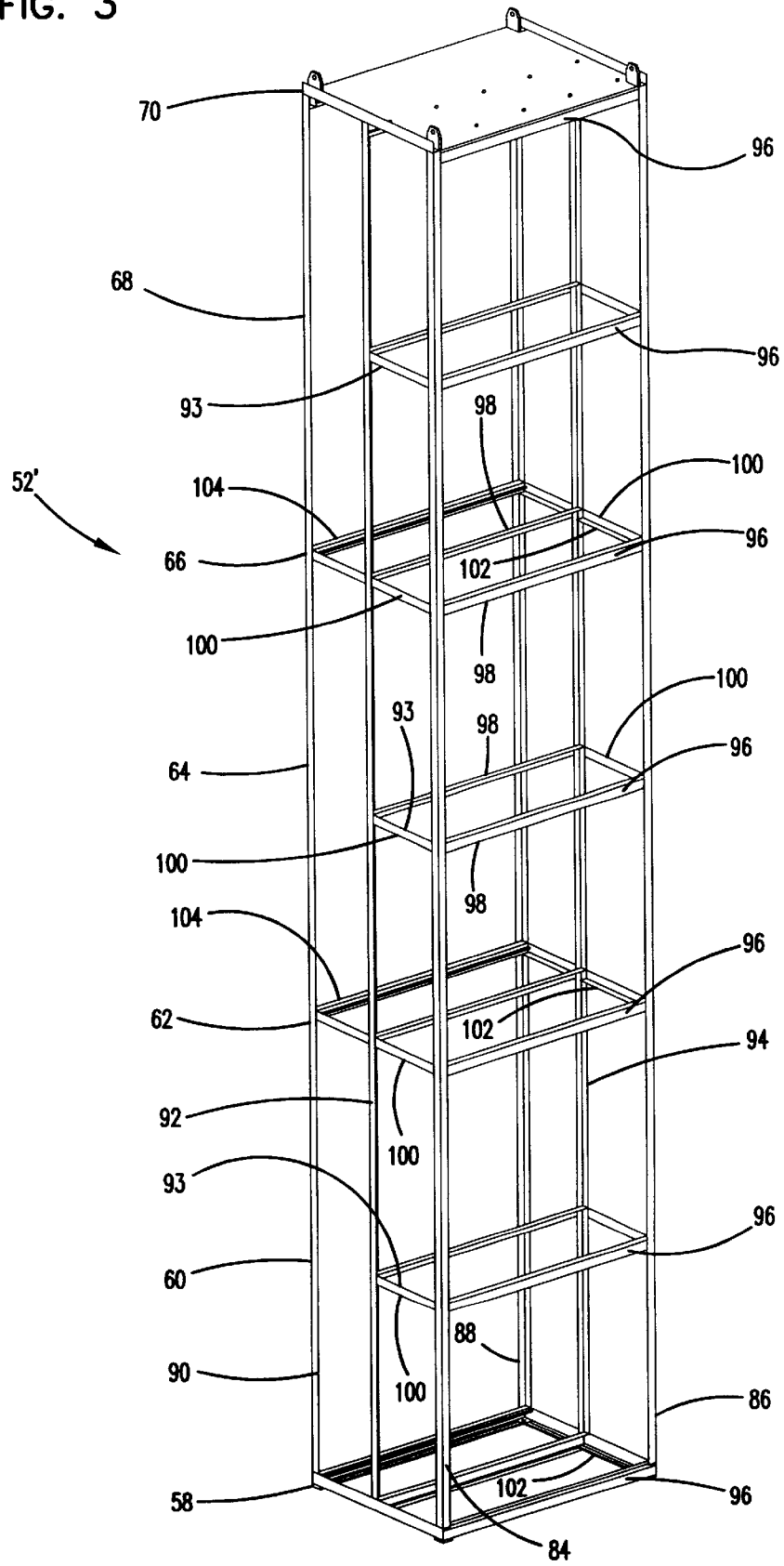
FIG. 3 is a perspective view of a frame forming a single bay of the evaporative cooler of FIG. 2.

FIG. 3 illustrates a frame 52' that corresponds to a single bay 54 of the frame 52. The frame 52' is generally rectangular and includes four substantially vertical corner supports 84, 86, 88 and 90. A first substantially vertical intermediate support 92 is positioned between the corner supports 84 and 90, while a second substantially vertical intermediate support 94 is positioned between the corner supports 86 and 88. Generally rectangular tray supports 96 are positioned at the levels 58, 60, 62, 64, 66, 68 and 70 of the frame 52'. For example, the tray supports 96 are mounted between the first and second intermediate supports 92 and 94, and the corner supports 84 and 86. The tray supports 96 include side members 98 that extend along lengths of the supports 96, and end members 100 that extend along widths of the supports 96. At levels 58, 62 and 66, the end members 100 include inwardly projecting bottom flanges 102. Also at levels 58, 62 and 66, the frame 52' includes generally rectangular grate supports 104 for securing the grates 80 to the frame 52'. At levels 58, 60, 62, 64, 66 and 68, a generally U-shaped layer of caulk 93 or other resilient sealing material is positioned along the outer surfaces of the end member 100, the corner supports 84 and the intermediate supports 92. The caulk 93 forms a seal between adjacent bays when the cooler 50 is assembled.

Figure 4:
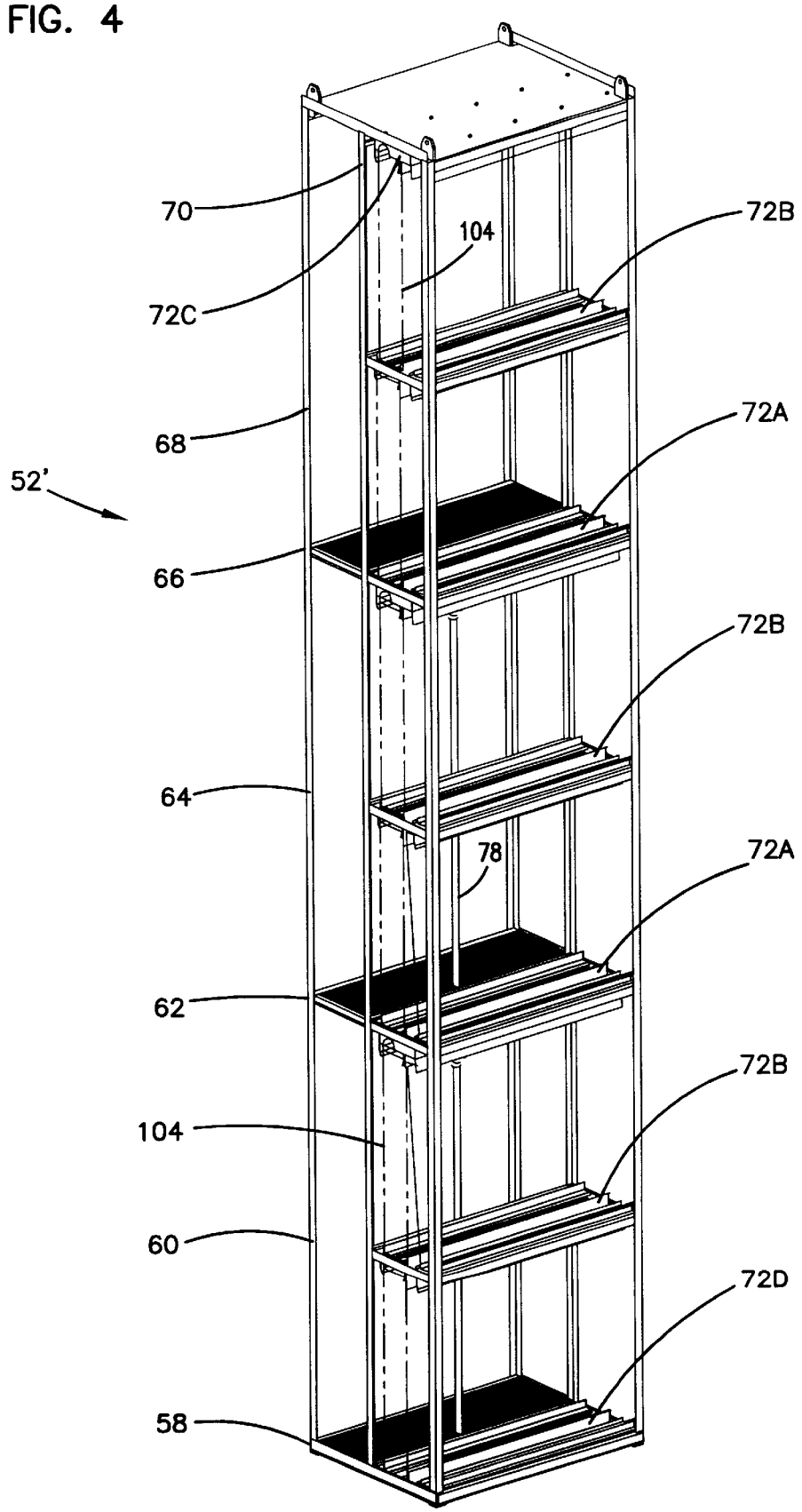
FIG. 4 is a perspective view of the frame of FIG. 3 with trays and grates mounted thereon.

FIG. 4 shows the frame 52' with the trays 72A, 72B, 72C and 72D secured at the various levels 58, 60, 62, 64, 66, 68 and 70. One of the return lines 78 is shown for draining collected water from the collection trays 72A and the bottom tray 72D. Volumes of cooler media 104 are schematically shown in FIG. 4. The volumes of cooler media 104 are supported by the collection trays 72A, the flow-through trays 72B and the bottom tray 72D.

Figure 5:
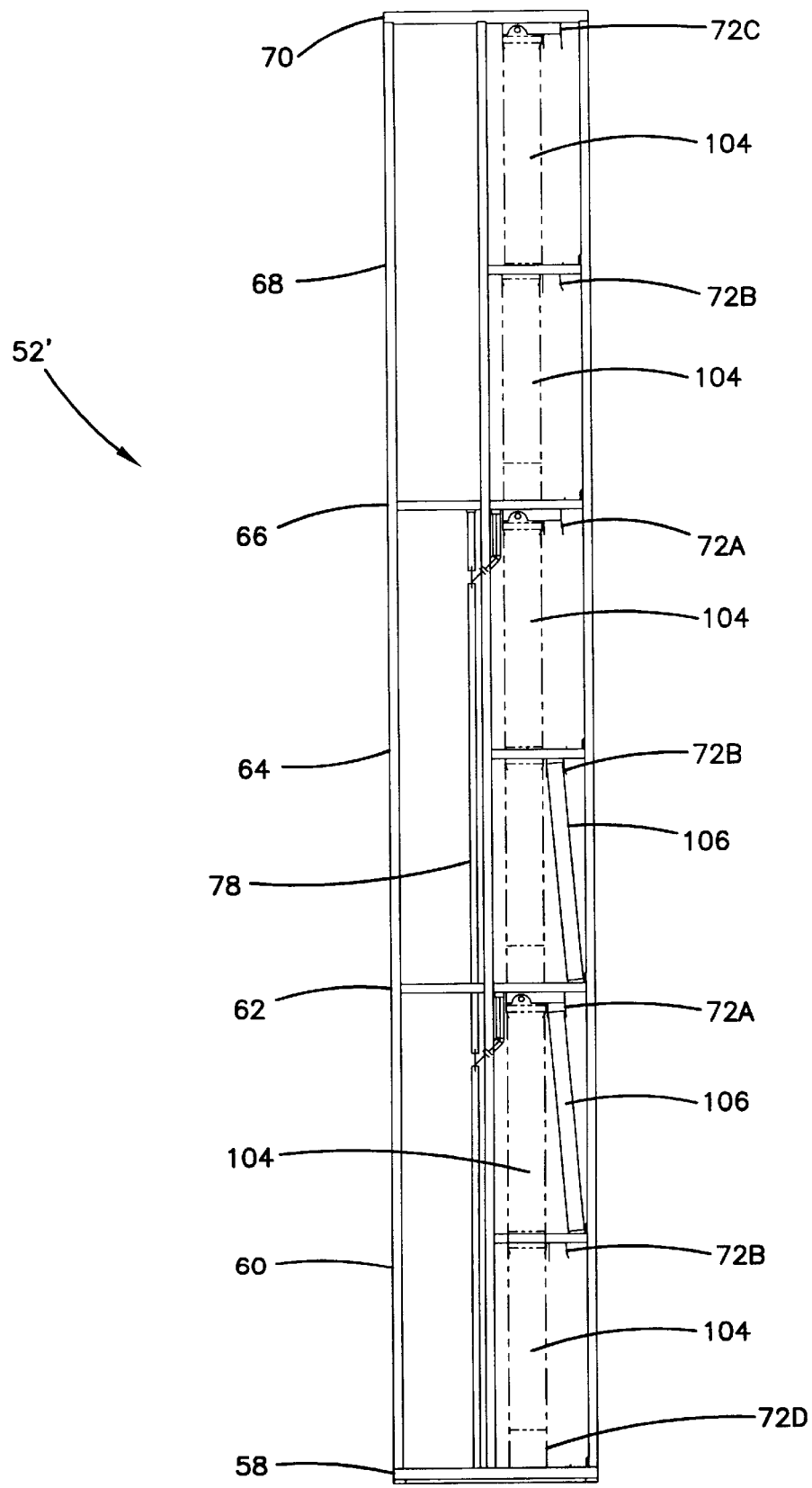
FIG. 5 is a schematic end view of the evaporative cooler of FIG. 2 with volumes of cooling media and mist eliminators schematically shown mounted in the evaporative cooler.

FIG. 5 is a schematic end view of the cooler 50. As shown in FIG. 5, the volumes of cooler media 104 are shown positioned between each of the levels 58–70 of the frame 52. Again, one of the return lines 78 is shown for draining water collected in the collection trays 72A. Also, mist eliminators 106 are shown mounted on levels 60 and 62 at locations downstream from the volumes of cooler media 104. In one particular embodiment of the present invention, the mist eliminators 106 are aligned at angles in the range of 5–10 degrees relative to vertical, with a top end of each mist eliminator being in close proximity to a corresponding filter media 104. The mist eliminators 106 can be made of any suitable material conventionally used in evaporative coolers. For example, the mist eliminators can comprise polyvinyl chloride (PVC). Suitable mist eliminators are sold by Munters Corporation of Ft. Myers, Fla. In use, mist eliminators are preferably mounted between each of the levels 58, 60, 62, 64, 66, 68 and 70.

Figure 6:
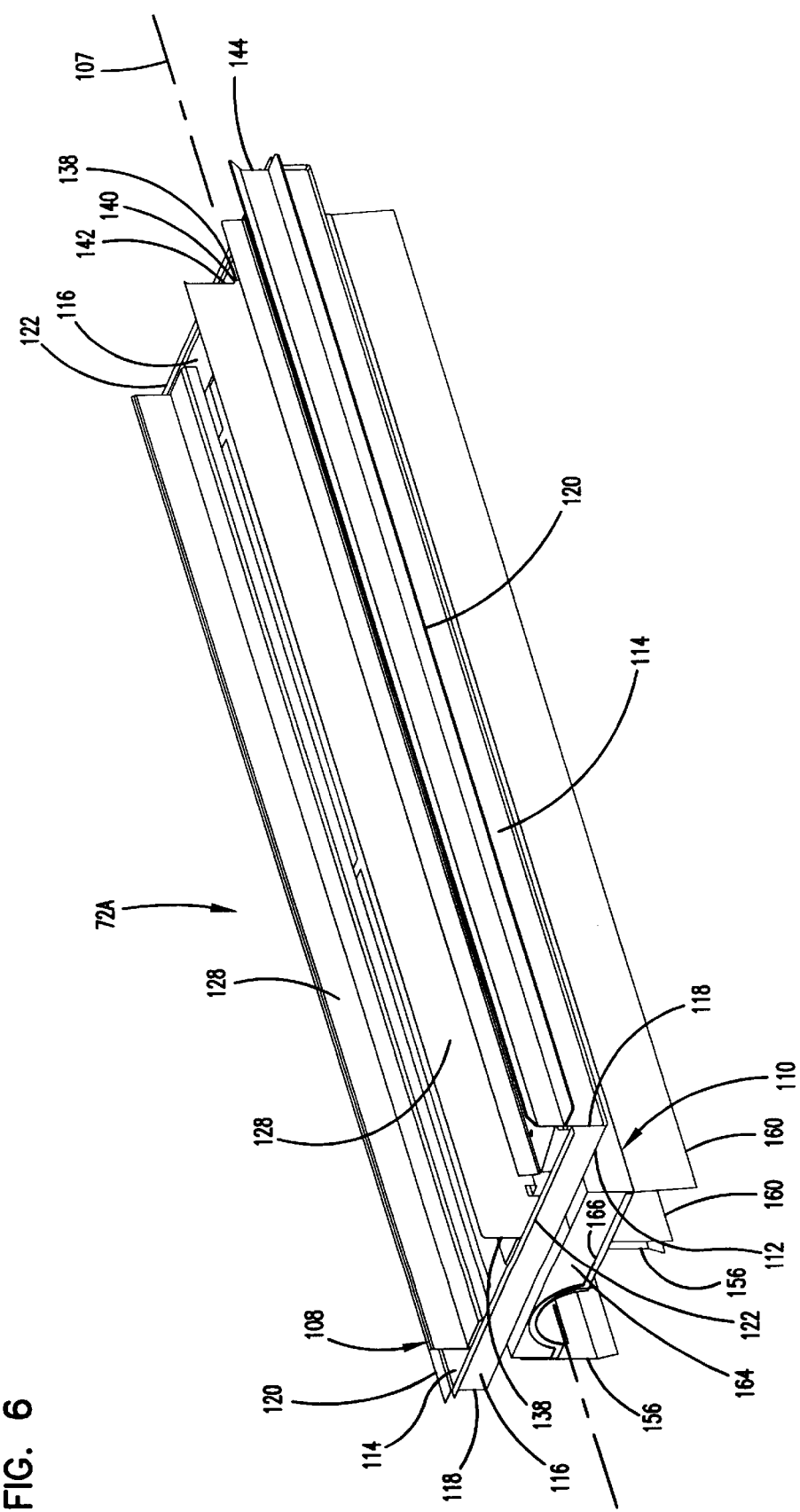
FIG. 6 is a perspective view of an evaporative cooler tray constructed in accordance with the principles of the present invention.

FIGS. 6–9 illustrate one of the collection trays 72A in isolation from the frame 52. As shown in FIG. 6, the collection tray 72A is aligned along (i.e., generally parallel to) a central longitudinal axis 107. Generally, the collection tray 72A includes an upper pan portion 108 for collecting water that flows through the volumes of cooler media 104, and a lower dispersion portion 110 for dispersing water over the volumes of cooler media 104.

Figure 9:
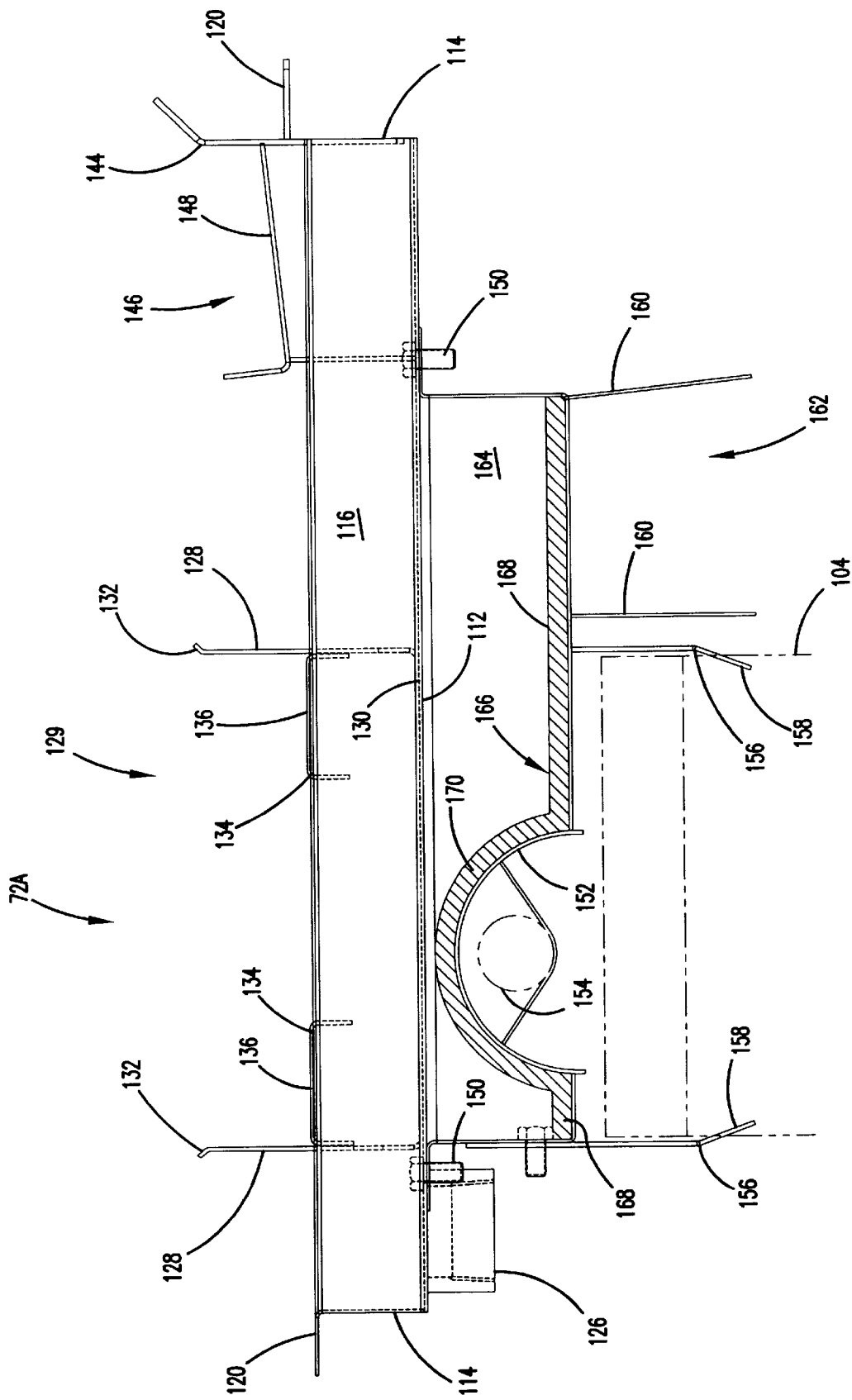
FIG. 9 is a right end view of the tray of FIG. 7.

Referring to FIG. 9, the collection tray 72A includes a bottom wall 112 and two oppositely disposed side walls 114 that project upward from the bottom wall 112 and extend generally parallel to the longitudinal axis 107. As shown in FIG. 6, the upper pan portion 108 also includes two end walls 116 that project upward from the bottom wall 112 and extend between the side walls 114. The end walls 116 are oriented generally transverse with respect to the longitudinal axis 107. The side walls 114 and the end walls 116 intersect or meet at corner edges 118.

For facilitating mounting the collection tray 72A on the frame 52, the tray 72A includes side flanges 120 that project transversely outward from the side walls 114. Similarly, the tray 72A includes end flanges 122 that project transversely outward from upper edges of the end walls 116. As best shown in FIG. 7, the side flanges 120 define elongated openings 124 for use in bolting or otherwise securing the side flanges 120 to the side members 98 of the frame 52. The elongated openings 124 are elongated in a dimension generally transverse with respect to the longitudinal axis 107 of the tray 72A. The elongated openings 124 are advantageous because they allow the mounting position of the tray 72A to be laterally adjusted (e.g. adjusted in the direction transverse with respect to the longitudinal axis 107) relative to the frame 52. The ability to laterally adjust the position of the tray 72A relative to the frame 52 assists in achieving longitudinal alignment of the trays 72A that are mounted on common levels.

The bottom wall 112 includes a continuous top surface that extends between the side walls 114 and also between the end walls 116. The bottom wall 112, the side walls 114, and the end walls 116 cooperate to form a pan arranged and configured to hold water. As shown in FIGS. 7–9, the pan includes a drain opening 126 defined through the bottom wall 112 for allowing collected water to be drained from the pan. Preferably, the drain opening 126 is connected in fluid communication with one of the return lines 78 of the evaporative cooler 50 such that water collected in the pan is drained through the return line 78 and returned to the sump 76.

The upper pan portion 108 also includes spaced apart cooler media retaining members 128 that extend along (i.e., are generally parallel to) the longitudinal axis 107 between the end walls 116. The retaining members 128 define a channel 129 for receiving a lower end of one of the volumes of cooling media 104. As shown in FIG. 9, the retaining members 128 include base ends 130 connected to the bottom wall 112, and top ends 132 that taper outward to facilitate inserting volume of cooler media within the channel 129 between the retaining members 128. Support members 134 project laterally outward from inner surfaces of the retaining members 128. The support members 134 have top surfaces 136 that are substantially parallel to the bottom wall 112 and are aligned slightly above the top edges of the end walls 116. In use, a volume of cooler media is inserted within the channel 129 between the retaining members 128 such that a lower portion of the volume of cooler media rests upon the support members 134. In this manner, the support members 134 hold the volume of cooler media above the bottom wall 112 of the pan portion 108.

As shown in FIG. 6, the cooler media retaining members 128 have ends 138 that are connected to inner surfaces of the end walls 116 to enhance the structural integrity of the tray 72A. The ends 138 include upper shoulders, cut-away portions or notches 140 that provide upper clearance gaps 142 between the ends 138 of the retaining members 128, and the inner surfaces of the end walls 116.

The upper pan portion 108 also includes a mist eliminator retaining bracket 144. The bracket 144 is supported above the top edges of the end walls 116, and defines a channel 146 that extends generally parallel to the longitudinal axis 107 between the end walls 116 of the pan portion 108. As shown in FIG. 9, the channel 146 is sized to receive a lower end of one of the mist eliminators 106. A lower wall 148 is inclined with respect to horizontal in order to align the mist eliminator 106 at an oblique angle with respect to vertical.

The dispersion portion 110 of the collection tray 72A is secured beneath the bottom wall 112 of the pan portion 108 by conventional techniques such as bolts 150. As shown in FIG. 9, the dispersion portion 110 includes a curved dispersion plate 152 positioned above a manifold 154. As previously described with respect to the embodiment of FIGS. 1A and 1B, the manifold 154 preferably includes a plurality of upwardly directed orifices for spraying water upward against the lower surface of the curved dispersion plate 152. The dispersion plate 152 disperses the water from the manifold 154 across the top of one of the volumes of cooler media 104 that is mounted below the dispersion plate 152. To further enhance dispersion, a conventional dispersion pad (not shown) can be positioned between the dispersion plates 152 and their corresponding volumes of cooler media 104. The top of one of the volumes of cooler media 104 is retained beneath the curved dispersion plate 152 by a pair of downwardly projecting retaining members 156. Lower ends 158 of the retaining members 156 taper toward one another. A top end of the cooler media 104 is inserted between the retaining members 156.

The dispersion portion 110 also includes downwardly projecting retaining members 160 defining a channel 162 sized for receiving a top end of one of the mist eliminators 106. The channel 162 extends along the longitudinal axis 107.

The dispersion portion 110 further includes substantially parallel end walls 164 that are generally transversely aligned with respect to the longitudinal axis 107. As shown in FIGS. 6 and 9, at least one of the ends walls 164 includes a resilient sealing member or strip 166 for forming a fluid tight seal between the dispersion portions 110 when the collection trays 72A are aligned end-to-end with respect to one another. The sealing strips 166 preferably include straight portions 168 that extend along the lower edges of the end walls 164, and curved portions 170 that extend along the curved dispersion plates 152. The sealing strips 166 can be made of any type of resilient material such as rubber or a closed-cell type of foam. In certain embodiments, the resilient material can cover the entire outer surface of the end walls 164.

The collection trays 72A are preferably mounted at levels 62 and 66 of the frame 52. Preferably, the collection trays 72A of common levels are arranged in end-to-end relationships with one another such that the longitudinal axes 107 are in general alignment with one another. To mount the collection trays 72A on the frame 52, the trays 72A are placed on the tray supports 96 such that the side flanges 120 rest upon the side members 98 of the tray supports 96, the bottom walls 112 seat upon the bottom flanges 102 of the tray supports 96, and the end flanges 122 seat upon the end members 100 of the tray supports 96. Once the collection trays 72A have been placed on the tray supports 96, the collection trays 72A are preferably connected to the tray supports 96 through the use of connecting members such as bolts that are inserted through the elongated openings 124 and secured to the side members 98 of the tray supports 96. The elongated openings 124 allow the trays 72A to be laterally adjusted relative to one another to achieve longitudinal alignments.

Figure 10:
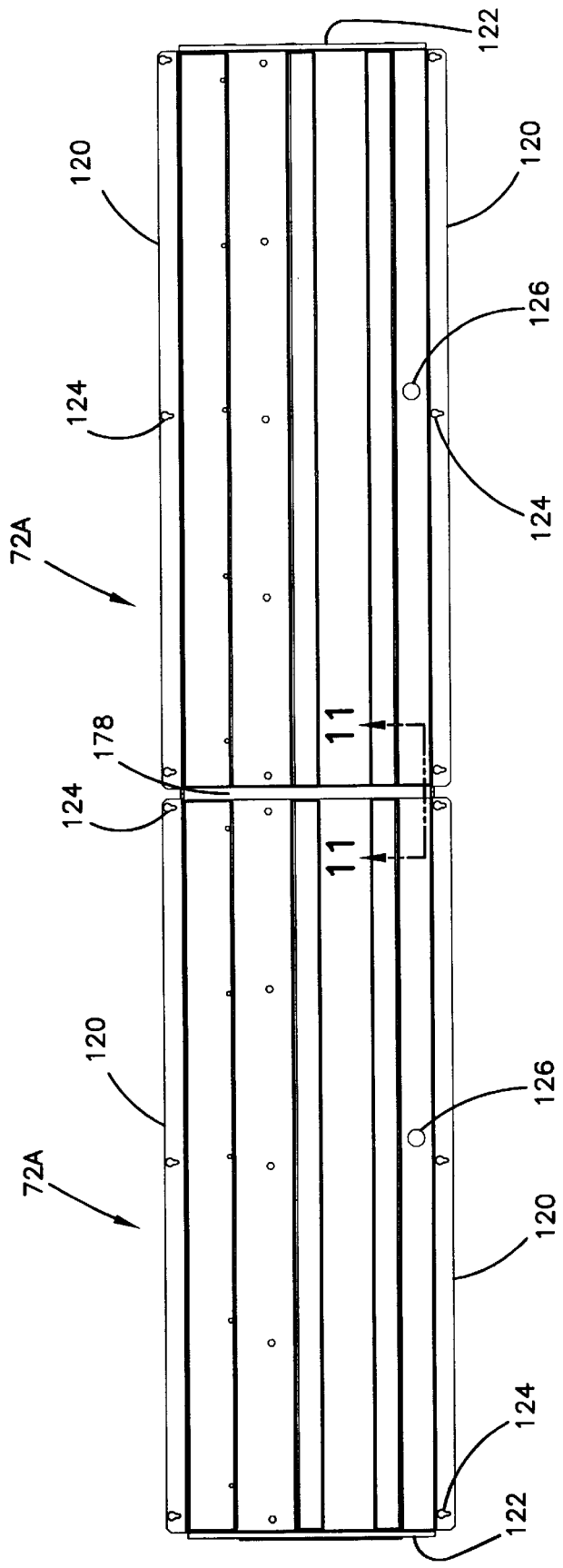
FIG. 10 is a top plan view of two of the trays of FIG. 6 interconnected by a clip.
Figure 11:
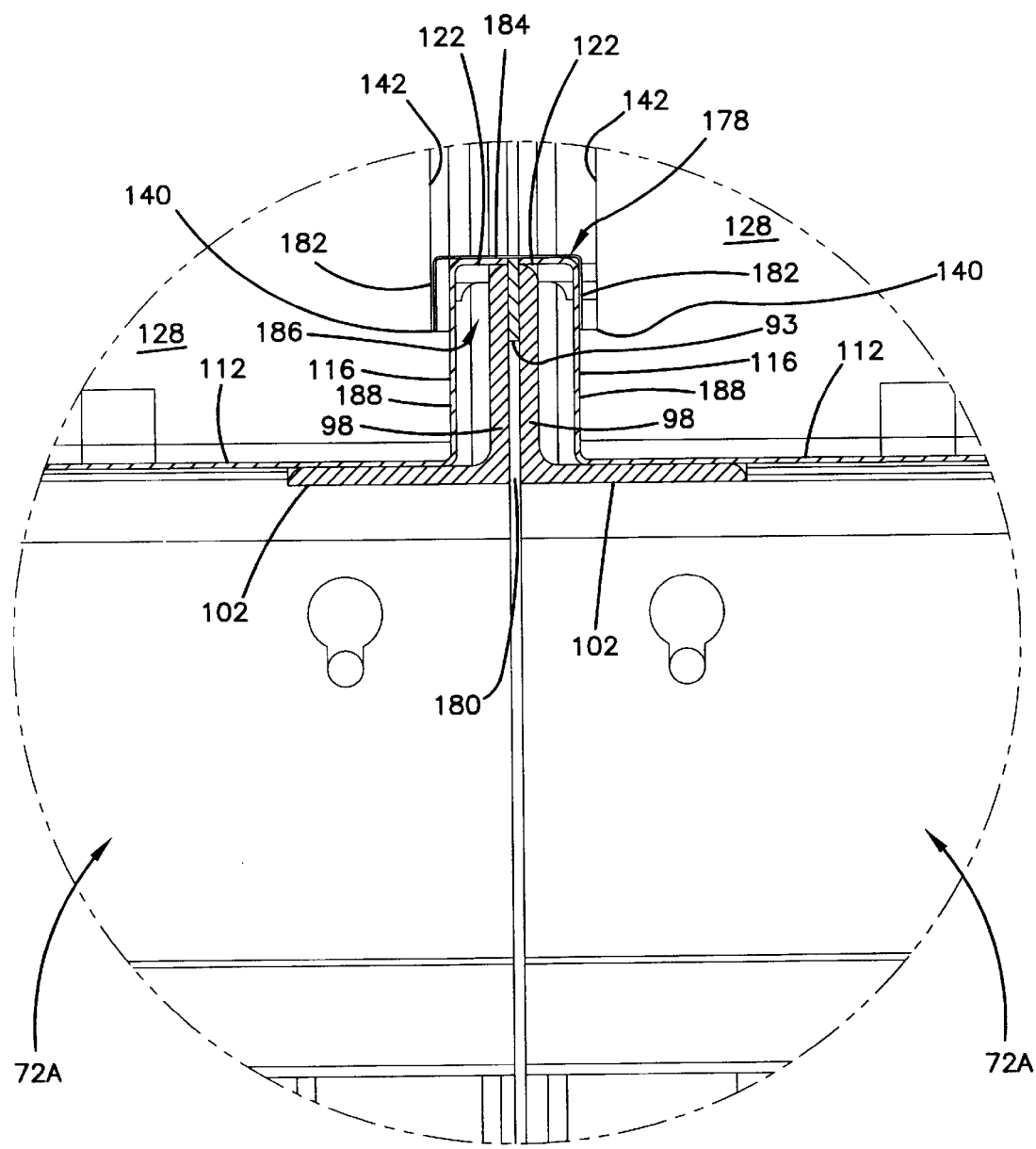
FIG. 11 is a cross-sectional view taken along section line 11—11 of FIG. 10.
Figure 12:
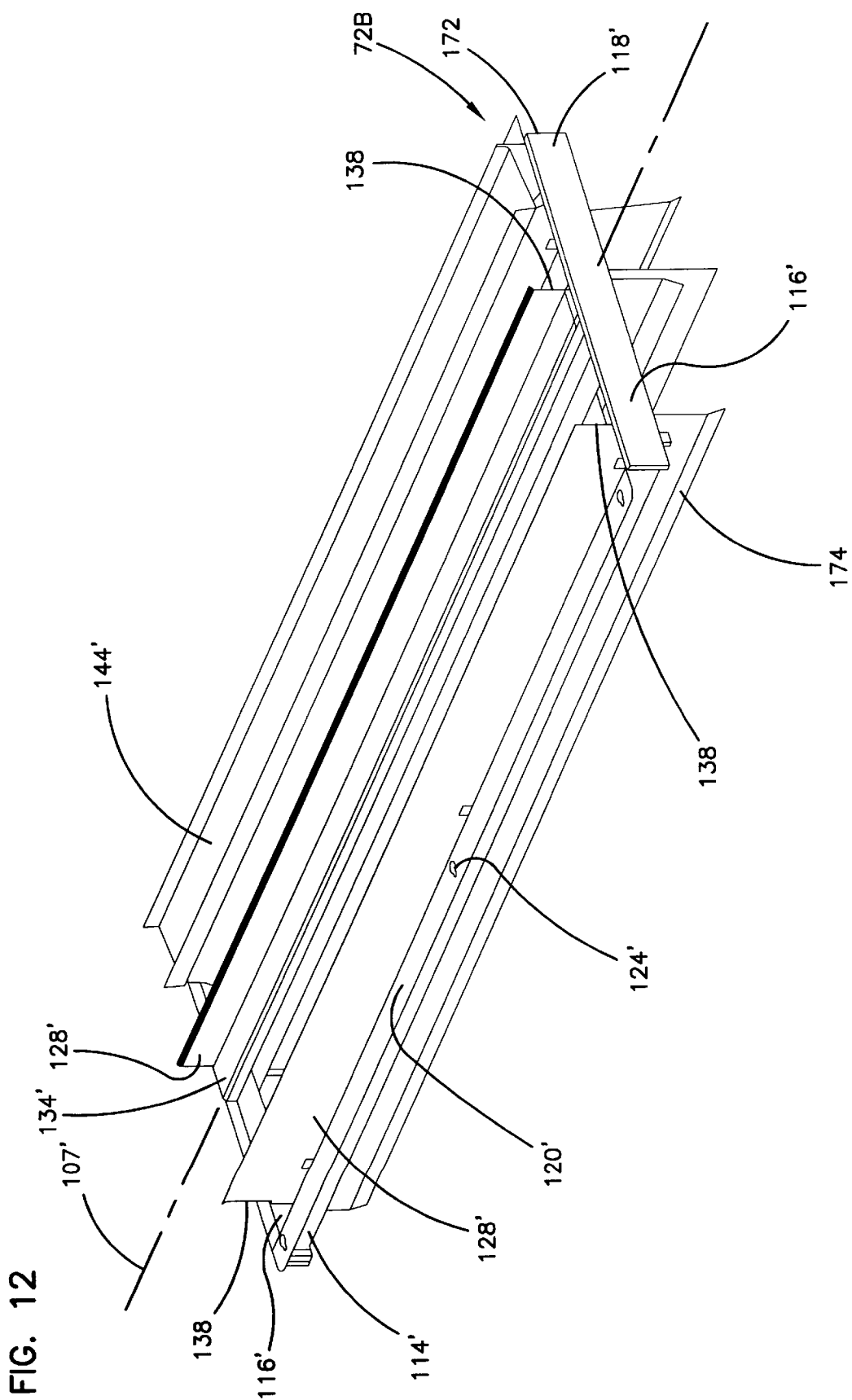
FIG. 12 is a perspective view of an alternative tray constructed in accordance with the principles of the present invention.

After the trays 72A have been secured to the frame 52, elongated clips are preferably mounted over adjacent end walls 116 of the trays 72A to inhibit leakage between the trays 72A. For example, FIG. 10 shows two of the trays 72A positioned in end-to-end alignment with a clip 178 mounted between the trays 72A. As shown in FIG. 11, the end walls 116 of the trays 72A are positioned adjacent to one another, bottom walls 112 of the trays 72A are seated upon the bottom flanges 102 of the tray supports 96, and the end flanges 122 are seated upon the side members 98 of the tray supports 96. The end flanges 122 are preferably aligned in substantially the same horizontal plane. A space 180 is formed between free ends of the end flanges 122. The clip 178 is mounted over the adjacent end walls 116 and covers the space 180. As shown in FIG. 10, the clip 178 preferably has a length generally equal to the length of the end walls 116. The space 180 is also sealed by the layer or bead of caulk 93.

Referring back to FIG. 11, the clip 178 has a generally U-shaped cross section and includes two substantially parallel leg portions 182 connected by a bridge portion 184. The bridge portion 184 is preferably transversely aligned with respect to the leg portions 182. As shown in FIG. 11, the clip 178 defines a channel 186 in which the adjacent end walls 116 of the trays 72A are received. The bridge portion 184 of the clip 178 rests upon the end flanges 122, while the leg portions 182 extend along interior surfaces 188 of the end walls 116. Clearance for the legs 182 is provided by the clearance gaps 142 formed between the retaining members 128 and the end walls 116. In this manner, the clip 178 straddles the adjacent end walls 116.

FIGS. 12–15 illustrate one of the flow-through trays 72B in isolation from the frame 52. It will be appreciated that the flow-through tray 72B includes many of the same elements or features as the collection tray 72A of FIGS. 6–9. In this regard elements of the flow-through tray 72B that have been previously described with respect to the collection tray 72A will be assigned common reference numerals with the addition of apostrophes to distinguish the embodiments.

The flow-through tray 72B extends along a longitudinal axis 107' and includes an upper portion 172 positioned above a lower portion 174. The upper portion 172 includes a bottom wall 112' and two substantially parallel side walls 114' that project upward from the bottom wall 112' and extend along the longitudinal axis 107'. The upper portion 172 also includes end walls 116' that extend transversely between the side walls 114' and intersect the side walls 114' at corner edges 118'. Side flanges 120' project transversely outward from the side walls 114', while end flanges 122' project transversely outward from the end walls 116'. The side flanges 120' define elongated openings 124' for bolting or otherwise securing the flow-through tray 72B to the frame 52.

Figure 15:
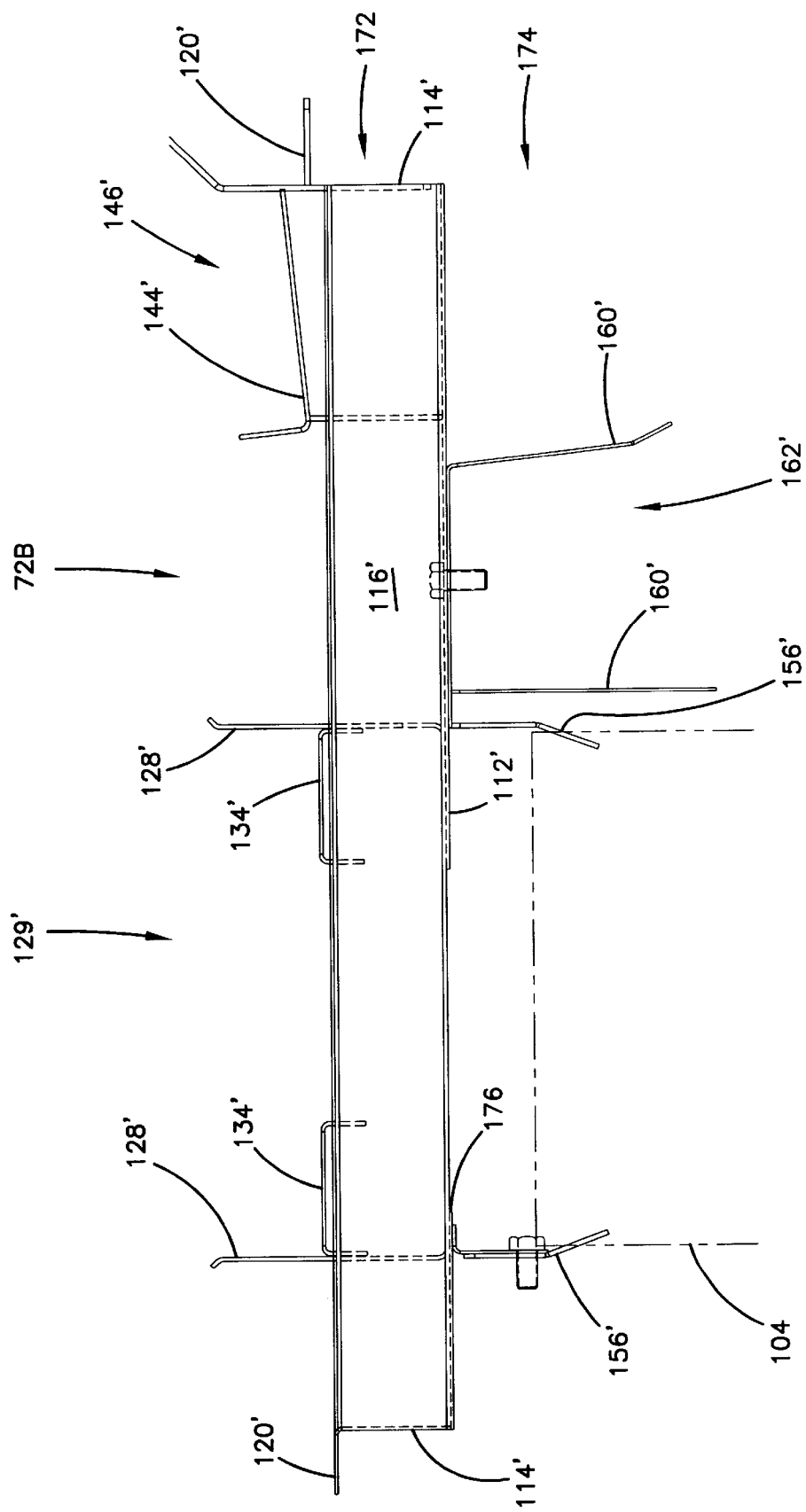
FIG. 15 is a right end view of the tray of FIG. 13.
Figure 17:
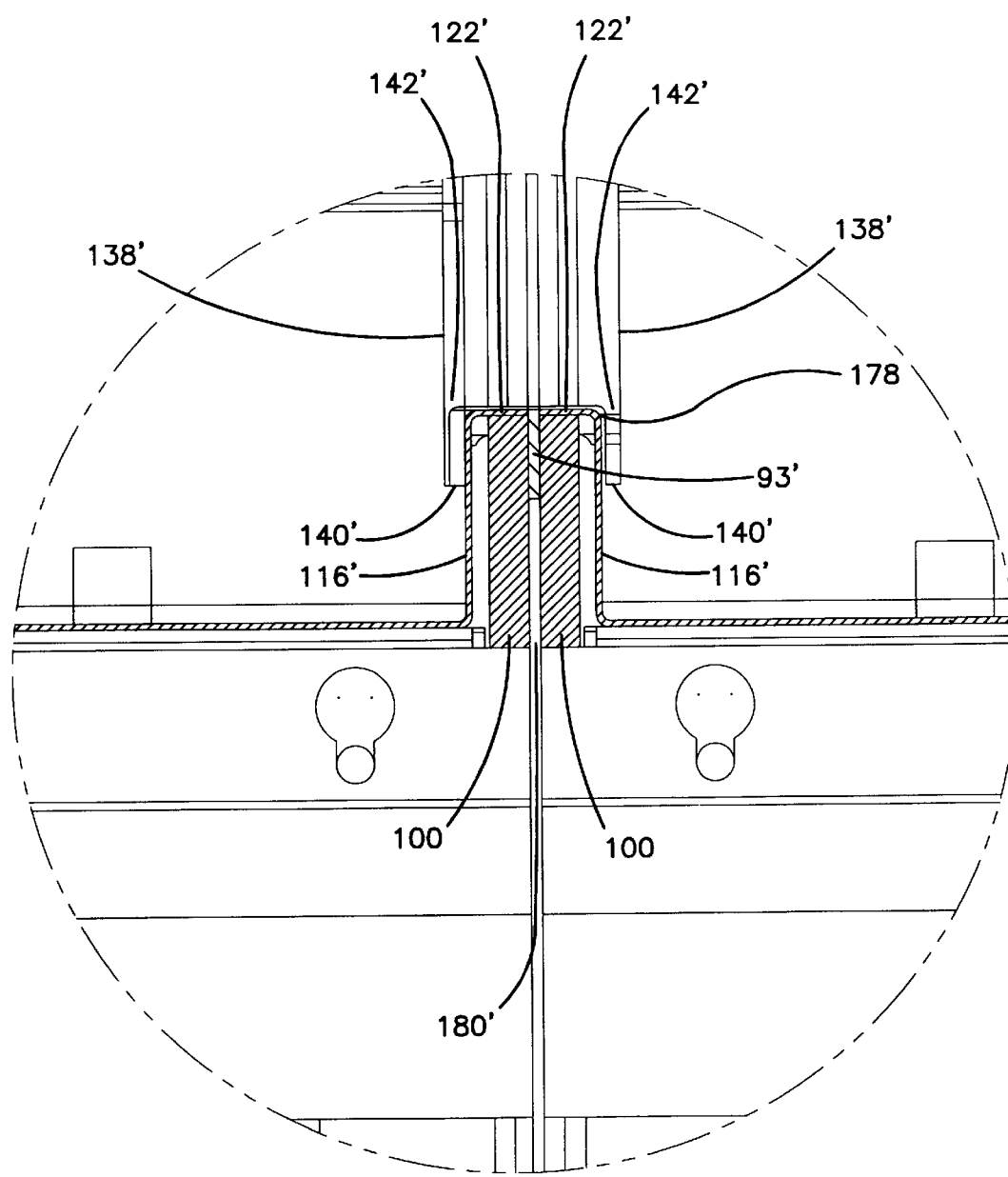
FIG. 17 is a cross-sectional view taken along section line 17—17 of FIG. 16.

The upper portion 172 of the flow-through tray 72B also includes two spaced apart cooler media retaining members 128'. As shown in FIG. 15, the cooler media retaining members 128' define a channel 129' for receiving a lower portion of one of the volumes of cooler media 104. Support members 134' project from the retaining members 128' into the channel 129'. The support members 134' are adapted for supporting the lower end of the volume of cooler media within the channel 129' such that the bottom of the cooler media is spaced from the bottom wall 112' of the flow-through tray 72B. The cooler media retaining members 128' of the upper portion 172 have ends 138' that are connected to interior surfaces of the end walls 116'. As shown in FIG. 17, the ends 138' include cut away portions, shoulders or notches 140' that define clearance gaps 142 between the ends 138' and the interior surfaces of the end walls 116'.

As shown in FIG. 15, the bottom wall 112' of the tray 72B defines a flow-through opening 176 positioned directly beneath the channel 129' defined by the cooler media retaining members 128'. The flow-through opening 176 extends completely through the bottom wall 112' and is elongated in a direction extending along the longitudinal axis 107'. The flow-through opening 176 allows water to pass through the bottom wall 112' such that water is not accumulated at the upper portion 172 of the flow-through tray 72B.

The upper portion 172 of the flow-through tray 72B also includes a bracket 144' having an upwardly opening channel 146' adapted for receiving a lower end of one of the mist eliminators 106.

The lower portion 174 of the tray 72B includes retaining members 156' positioned on opposite sides of the flow-through opening 176. The retaining members 156' project downward from the bottom wall 112' and define a channel sized for receiving a top end of one of the volumes of cooler media 104.

The lower portion 174 also includes spaced-apart retaining members 160' that project downward from the bottom wall 112'. The retaining members 160' define a channel 162' sized for receiving a top end of one of the mist eliminators 106.

The flow-through trays 72B are preferably mounted on the frame 52 at levels 60, 64 and 68. Preferably, the flow-through trays 72B of common levels are positioned in an end-to-end relationship such that the longitudinal axes 107' are aligned with one another. For example, the flow-through trays of level 60 are positioned in an end-to-end relationship, the flow-through trays of level 64 are positioned in an end-to-end relationship, and the flow-through trays of level 68 are positioned in an end-to-end relationship. To secure the flow-through trays 72B to the frame 52, the trays 72B are placed on and supported by the generally rectangular tray supports 96 of the frame 52. For example, the trays 72B are positioned on the frame 52 such that the end flanges 122' rest upon the end members 100 of the tray supports 96, while the side flanges 120' rest upon the side members 98 of the tray supports 96. Preferably, the side flanges 120' are bolted to the side members 98 by bolts that extend through the elongated openings 124'. The elongation of the openings 124' allows the position of the flow-through trays 72B to be laterally adjusted relative to the frame 52 in order to achieve general longitudinal alignment between the flow-through trays 72B.

Figure 16:
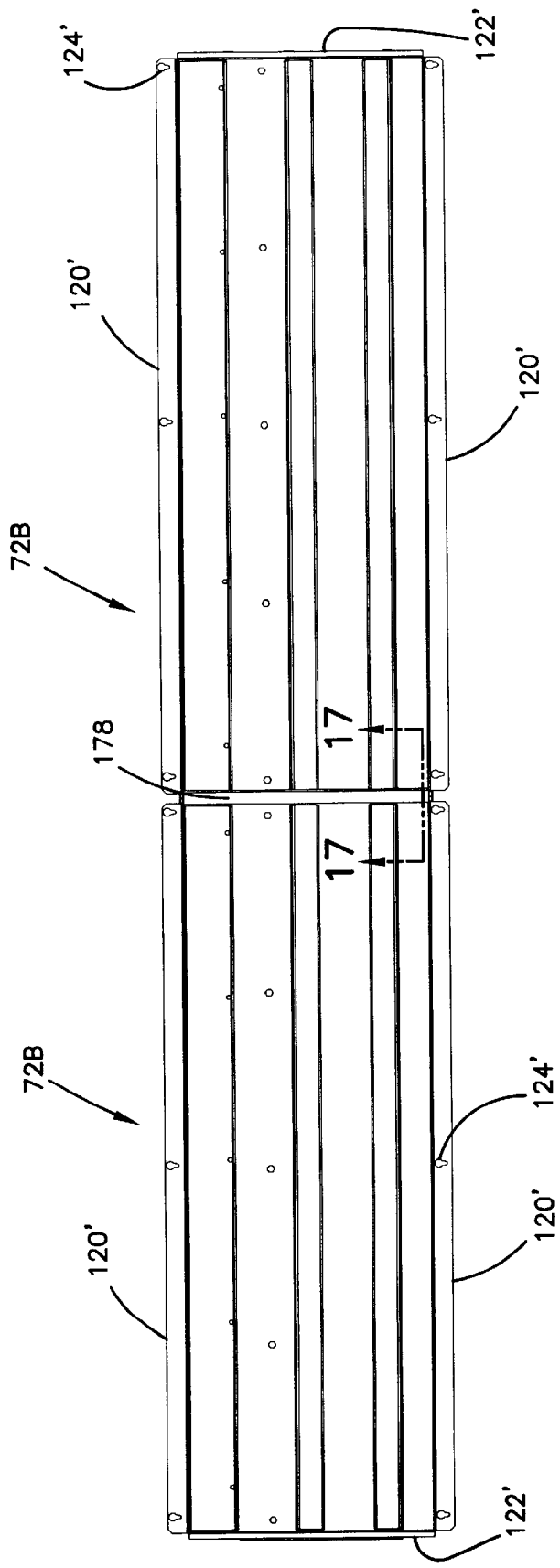
FIG. 16 is a top plan view of two of the trays of FIG. 12 with a clip mounted between the trays.

FIG. 16 shows two of the trays 72B positioned in an end-to-end relationship with respect to one another. One of the clips 178 is positioned between the trays 72B. The clip 178 has a length which is preferably generally equal to the length of the end walls 116'. As shown in FIG. 17, the trays 72B are positioned such that the end walls 116' of the trays 72B are oriented adjacent to one another. The end flanges 122' of the end walls 116' are seated upon the end members 100 of the tray supports 96 and are preferably aligned in a common horizontal plane. A space or gap 180' is defined between free ends of the end flanges 122'. The space 180' is covered by the clip 178 such that water is inhibited from leaking between the trays 72B. The space 180' is also sealed by a layer or bead of resilient material 93' such as caulk.

It will be appreciated that the top trays 72C and the bottom trays 72D are modified versions of the collection trays 72A. For example, the top trays 72C have the same structure as the dispersion portions 110 of the collection trays 72A, but do not include the pan portions 108. Similarly, the bottom trays 72D have the same configuration as the pan portions 108 of the collection trays 72A, but do not include the dispersion portions 110.

With regard to the foregoing description, it is to be understood that changes may be made in detail, especially in matters of the construction materials employed, and the size, shape and arrangement of the parts without departing from the scope of the present invention. For example, the number of media volumes, manifolds and pumps can be varied from those specifically illustrated. It is intended that the specification and the depicted aspects be considered exemplary only, with the true scope and spirit of the invention being indicated by the broad meaning of the following claims.

We claim:

1. An evaporative cooler comprising:

a frame including end supports and side supports;

first and second trays each having a longitudinal axis, each tray including a bottom wall and two side walls that project upwardly from the bottom wall and extend generally parallel to the longitudinal axis of each tray, each tray also including two end walls that project upward from the bottom wall and extend between the side walls, the trays additionally including spaced-apart cooler media retaining members that extend generally parallel to the longitudinal axis of each tray between the end walls, the retaining members defining elongated channels, the trays further including end flanges that project outwardly from top edges of the end walls and side flanges that project outwardly from top edges of the side walls;

the trays being positionable on the frame in an end-to-end relationship such the longitudinal axes are generally aligned with one another, the trays being mounted on the frame such that the side flanges seat on the side supports and the end flanges seat on the end supports, and one of the end flanges of the first tray is positioned adjacent to one of the end flanges of the second tray;

an elongated clip for inhibiting water leakage between the adjacent trays, the clip being mounted over the adjacent end flanges of the trays and including a bridge portion that extends over the end flanges and spaced-apart legs that extend downwardly from the bridge portion along the end walls of the trays, and the elongated clip having a length at least equal to a distance between the side walls of each of the trays; and volumes of cooler media held within the elongated channels defined between the retaining members.

2. The evaporative cooler of claim 1, wherein the cooler media retaining members are connected to the end walls, and wherein the cooler media retaining members define end notches for providing clearance for the legs of the clip.

3. The evaporative cooler of claim 1, wherein the clip has a generally U-shaped cross-section.

4. The evaporative cooler of claim 1, wherein the clip defines an elongated channel that receives the adjacent end flanges of the trays.

5. The evaporative cooler of claim 1, wherein the side flanges define openings for allowing the trays to be connected to the frame, the openings being elongated in a dimension generally transverse with respect to the longitudinal axes.

6. The evaporative cooler of claim 1, further comprising spaced-apart mist eliminator retaining members that project upward from the bottom walls and extend between the end walls.

7. The evaporative cooler of claim 1, wherein the trays include curved water dispersion plates positioned beneath the bottom walls.

8. The evaporative cooler of claim 1, wherein the trays include bottom openings defined by the bottom walls for allowing water to drain through the trays.

9. The evaporative cooler of claim 1, wherein the trays are made of a plastic material.

10. The evaporative cooler of claim 1, wherein the clip is made of a plastic material.

11. An evaporative cooler comprising:

a frame defining a plurality of substantially vertical bays aligned in a generally side-by-side relationship, and a plurality of vertically spaced-apart substantially horizontal levels;

a plurality of trays, each tray including a longitudinal axis, the trays including bottom walls and side walls that project upward from the bottom walls and extend along the longitudinal axis of each tray, the trays also including end walls that project upward from the bottom walls and extend between the side walls;

the trays being positioned in the bays with the trays of common levels being arranged in end-to-end relationships;

volumes of cooler media supported by the trays; and elongated clips for inhibiting water leakage between the end walls of trays of common levels, the clips being mounted over adjacent end walls of the trays arranged in the end-to-end relationships, the trays having widths defined between the side walls of the trays, and the clips extending across at least essentially the entire widths of the trays.

12. A method for assembling an evaporative cooler comprising:

providing a frame;

providing first and second trays each having a longitudinal axis, each tray including a bottom wall and two side walls that project upward from the bottom wall and extend along each longitudinal axis, each tray also including two end walls that project upward from the bottom wall and extend between the side walls;

securing the first and second trays to the frame in an end-to-end relationship such that the longitudinal axes are aligned with one another, and one of the end walls of the first tray is positioned adjacent to one of the end walls of the second tray such that a gap is defined thereinbetween, the gap having a length that extends along a width of the trays;

covering a majority of the length of the gap with one or more elongated clips such that water is inhibited from leaking through the gap; and supporting volumes of cooler media on the trays.

* * * * *